Patented June 14, 1932

1,863,331

UNITED STATES PATENT OFFICE

ANTHONY JAMES HAILWOOD, ARNOLD SHEPHERDSON, AND ALEXANDER STEWART, OF BLACKLEY, MANCHESTER, ENGLAND, ASSIGNORS TO IMPERIAL CHEMICAL INDUSTRIES LIMITED, OF LONDON, ENGLAND

PROCESS OF MAKING COLLOIDAL DISPERSIONS OF INSOLUBLE COLORS IN ORGANIC MATERIALS

No Drawing. Application filed September 5, 1929, Serial No. 390,652, and in Great Britain September 12, 1928.

This invention relates to processes of making colloidal dispersions or solutions of insoluble colors in organic materials, wherein insoluble colors in finely divided form are colloidally dispersed in an aqueous medium, and are then transferred to and colloidally dispersed in such organic materials without substantially altering their state of subdivision; and it further comprises the products so produced, the said products having a clear uniform color and being substantially free of turbidity.

These processes and the products produced are new, advantageous and useful. The products find many useful and advantageous applications in the arts. They may be used in fabricating many commercial articles or they may be used to dye or color other articles or compositions.

Organic materials having a clear and uniform color and not showing any substantial amount of turbidity are of commercial and technical desirability. Such colored organic materials have in a few instances been produced by dissolving certain colors in certain specific organic materials. However this procedure is restricted and limited, there being only a few colors soluble in organic materials. Many attempts have been made to overcome this limitation as to solubility, by dispersing insoluble colors in various organic materials. Finely divided colors have been mechanically mixed with various organic materials by stirring or milling the insoluble color into the organic material or by grinding together the two materials. Special and expensive machinery is necessary. In cases where the organic material is an oil, an inflammable, volatile or explosive liquid, milling may be not only difficult but dangerous. The products obtained, however are not satisfactory. The tinctorial power of the insoluble dyestuffs in the organic materials is low; relatively large amounts of color being necessary to produce colored materials. Organic materials have been colored in this manner without obtaining a clear and uniform colored material. Such materials frequently show marked turbidity which is in many cases highly undesirable. With any marked degree of turbidity the colored material is opaque or has very little transparency. This turbidity is largely due to the coarseness of the dispersion of the insoluble colors. It is difficult to produce extremely fine dispersions of insoluble bodies in organic materials.

In the present invention uniformly colored materials are prepared by the expedient of making a dispersion of a color in water, emulsifying a liquid carrier in the suspension and then breaking the emulsion. Under the conditions, the dispersed color is transferred to the carrier without losing its fine state of sub-division. The carrier may be the final material which is to be colored or it may be an intermediate material intended for admixture with the final material.

The carrier may be either a solid or a liquid material; but it should be liquid at the time of making the emulsion. Solids may be temporarily reduced to a liquid condition by heat or by the use of a solvent which can be removed after the emulsion is broken with transfer of the color to the carrier. Paraffin may be used as a carrier and liquefied by heat to permit emulsion. Other solid organic materials of fusible nature may be similarly used. Or the solid material may be liquefied by solution in a volatile organic solvent such as benzene; using a solvent insoluble in water. In using normal liquid carriers, such as linseed oil, it is often advantageous to thin them with a volatile solvent like benzene prior to emulsifying.

In making colloidal aqueous dispersions of color various expedients may be adopted such as precipitation or by production of insoluble colors in situ.

A soluble leuco derivative of a vat dyestuff may be dissolved in aqueous solution and then oxidized to produce an aqueous colloidal dispersion of the vat dyestuff. Aqueous solutions containing, respectively, a diazo compound and an azo dye coupling component, may be mixed and an insoluble azo dyestuff produced by the coupling of these two components giving an aqueous colloidal dispersion of an azo dyestuff. Again, certain dyestuffs which are water insoluble may be dissolved in sulphuric acid to give a solution of the dyestuff and then an aqueous colloidal dispersion of insoluble dyestuff produced by diluting the sulphuric acid solution. In all of these processes the continuous phase is water or an aqueous solution. While these aqueous colloidal dispersions of dyestuff can be produced in various ways it has hitherto proved difficult to transfer the dyestuff to organic media. In removing the water of the suspension the state of division of the dispersoid is changed.

In the present invention, colloidally dispersed colors may be transferred from aqueous media to an organic carrier material serving as a new continuous phase, transfer being without substantial alteration of the colloidal condition of the dyestuff particles.

The aqueous dispersion of color used in general should be free of the protective colloids sometimes used with dyestuffs to prevent aggregation or flocculation. Most of these protective colloids are of a lyophilic type and tend to prevent transference of the dispersed material to any other non-aqueous continuous phase. These protective colloids are generally used with dyestuffs to promote stability of the dispersion; but since an aqueous dispersion may be used in the present invention as soon as made promotion of the stability over long periods of time is not necessary.

In our processes, we first form a compound dispersion: an aqueous mixture having water or an aqueous mixture as the continuous phase, containing both a colloidal dispersion of an insoluble color and an organic carrier material in emulsified form. Then the emulsion is broken, the water or aqueous solution separated and removed, producing an organic carrier material having the color colloidally dispersed therein. A clear, uniformly colored product free from any substantial turbidity, is produced and containing insoluble color colloidally dispersed to such a degree that a high degree of magnification is necessary to recognize it as particles. To the unaided eye the colored carrier may appear as a clear solution or as a solution showing but the faintest trace of turbidity.

There are many modifications and variations within the generic scope of our invention. Aqueous colloidal dispersion of the insoluble colors may be produced in any of the ways set forth ante. The initial aqueous mixture of colloidally dispersed color and emulsified organic material may be made by mixing together an aqueous colloidal dispersion of the insoluble color and an aqueous emulsion of the organic material. Again an aqueous colloidal dispersion of the insoluble color may be first formed and then the organic material emulsified in this aqueous solution. Or an aqueous emulsion of the organic material may be prepared and then the colloidal dispersion of the insoluble color produced in situ in this aqueous emulsion. It is particularly advantageous to form the insoluble color in situ in the aqueous emulsion. In forming the insoluble color in situ in the aqueous emulsion, the dyestuff in soluble form may be introduced in an aqueous solution and then converted into the insoluble form. Or aqueous solutions of reactants may be mixed with the aqueous emulsion so as to react and produce the insoluble color in a colloidally dispersed form in situ. By any of these processes the use of complicated and expensive machinery is eliminated. In forming the initial aqueous mixture protective colloids may be used to stabilize the mixture until a thorough and uniform mixing of the components is obtained.

Irrespective of the way in which the initial aqueous emulsion and dispersion is formed, when the emulsion is broken the colloidally dispersed color and the organic material separate as a unitary and homogeneous mass from the water or aqueous solution. After removing the water or aqueous solution the colored product may be further treated to remove the remaining traces of moisture and further purify it. Various organic materials may be used in my process. Such organic materials as paraffin wax, anilin, resins, both synthetic and natural, oils, particularly fatty oils such as linseed and castor oil, and cellulose ester solutions such as nitrocellulose in a suitable solvent for example, cyclohexanol, are advantageous.

Various insoluble colors may be used for instance vat dyestuffs, insoluble azo dyestuffs and precipitable colors of all types, even purely inorganic materials such as pigments.

In emulsifying the organic materials, suitable emulsifying agents may be used. These emulsifying agents will naturally be chosen to suit the required conditions. Likewise suitable protective colloids may be added when forming the aqueous colloidal dispersion of the insoluble body.

The colored products produced by our process find particular useful application in the paint, rubber, lithograph, leather and lacquer industries. When producing a material to be used in any of these industries and for a particular application, the organic material may be chosen to fit the requirements of the specific industry and the desired application of the product.

The following examples are given to illustrate our invention and guide those skilled in the art. These examples in no way limit our invention. The parts are by weight.

*Example 1.—Caledon brown R dispersed in linseed oil*

A solution of 30 parts linseed oil and 90 parts benzene is emulsified by vigorous stirring with 10 parts water and 10 parts ammonium oleate. The leuco compound of the dyestuff is prepared from 8 parts Caledon brown R (color index 1151) 15 parts caustic soda 34%, 7.5 parts of sodium hydrosulphite, and 300 parts water, being kept at 50° C. until the dyestuff has been reduced to its soluble leuco compound, when it is poured in a slow stream into the emulsion prepared above, and stirred vigorously. Oxidation to the dyestuff is then effected, advantageously by air.

The emulsion is now broken by careful addition of hydrochloric acid, and the linseed oil after removal of the benzene and water contains the dyestuff in a transparent condition. In thin films the product is very clear and in spite of the deep brown color excellent transparent effects may be obtained with it. The water is removed by heating the material on a steam bath under reduced pressure.

*Example 2.—Duranthrene brilliant violet R in castor oil*

An emulsion is prepared of 16 parts castor oil with 3 parts ammonium oleate and 15 parts water. The leuco compound of duranthrene brilliant violet R (color index 1135) is prepared by reducing 4 parts of the dyestuff with 7.5 parts caustic soda 34%, 150 parts water, and 3.8 parts sodium hydrosulphite, the mixture being kept at 50° C. until the reduction is complete.

The soluble leuco compound of the dyestuff is now added to the castor oil emulsion with vigorous stirring, and allowed to oxidize, after which the castor oil is separated, washed and dried giving a transparent highly colored product suitable for use in nitrocotton lacquers and finishes. The drying may be effected by various means, such as centrifuging or vacuum drying.

*Example 3.—Indanthrone in paraffin wax*

8 parts of paraffin wax are emulsified in 75 parts of water at 70° C. containing 2 parts of ammonium oleate and 0.5 part of concentrated ammonia solution. To this system a vat made from 330 parts of water at 50° C. 10 parts 34% sodium hydrate solution 1.85 parts of indanthrone and 3 parts of sodium hydrosulphite is added, and the whole stirred vigorously whilst oxidation is effected. This may be done by means of air, for example.

When the oxidation is complete the emulsion is cooled and acidified by the addition of hydrochloric acid. The bright blue curd which separates is filtered off and washed. It may be used as such for some purposes and for others it may be dried. It is a tough paste, containing the dyestuff in a highly dispersed form. It may be used, among other purposes, for coloring rubber, being directly milled on the rolls or in other ways.

What we claim and desire to secure by Letters Patent is:—

1. In the manufacture of colored organic materials having colloidally dispersed therein an insoluble color, the process which comprises forming an aqueous emulsion and dispersion comprising water, an emulsified water insoluble organic liquid material and a colloidally dispersed insoluble color, breaking the said emulsion and separating the water from the said organic material and said insoluble color, thus producing a colored mass of organic material having colloidally dispersed therein said insoluble color.

2. The process of claim 1 in which the said organic material is a fatty oil.

3. The process of claim 1 in which the said organic material is linseed oil.

4. The process of claim 1 in which the said organic material is castor oil.

5. The process of claim 1 in which the organic material is paraffin wax.

6. The process of claim 1 in which the insoluble color is an insoluble vat dyestuff.

7. The process of claim 1 in which the insoluble color is an insoluble azo dye.

8. The process of claim 1 in which the said water insoluble organic liquid material is a solution of an organic compound in an organic solvent said organic solvent being insoluble and immiscible with water.

9. In the manufacture of colored organic materials having colloidally dispersed therein an insoluble color, the process which comprises forming an aqueous emulsion of a water insoluble organic liquid material, forming an aqueous colloidal dispersion of an insoluble color, mixing said aqueous emulsion and said aqueous dispersion to form an aqueous mixture comprising water, an emulsified organic material and a colloidally dispersed insoluble color, breaking the emulsion and separating the water from the said organic material and said insoluble color, thus producing a colored mass of organic material having colloidally dispersed therein said insoluble color.

10. The process of claim 1 in which the insoluble color is an insoluble mineral pigment.

11. In the manufacture of colored organic materials having colloidally dispersed therein an insoluble color, the steps which comprise precipitating an insoluble color in situ in an aqueous emulsion of a water insoluble organic liquid material to produce an aqueous mixture comprising water, an emulsified organic material and a colloidally dispersed insoluble color, and breaking said emulsion and separating the water from the said organic material and said insoluble color.

12. In the manufacture of colored fatty oils having colloidally dispersed therein an insoluble vat dyestuff, the process which comprises emulsifying said fatty oil in an aqueous solution, adding to said aqueous emulsion an aqueous solution of a leuco compound of a vat dyestuff, oxidizing said leuco compound to produce an insoluble vat dyestuff and give an aqueous mixture comprising water, an emulsified fatty oil and a colloidally dispersed insoluble vat dyestuff, breaking the emulsion and separating the aqueous solution from the said fatty oil and said insoluble vat dyestuff, thus producing a colored fatty oil having colloidally dispersed therein said insoluble vat dyestuff.

13. The process of claim 12, in which the fatty oil is linseed oil.

14. The process of claim 12, in which the fatty oil is castor oil.

15. In the manufacture of colored fatty oils having colloidally dispersed therein an insoluble vat dyestuff, the process which comprises dissolving linseed oil in benzene, emulsifying the organic solution thus obtained in an aqueous medium, adding to said emulsion an aqueous solution of a leuco compound of a vat dyestuff, oxidizing said leuco compound to produce an insoluble colloidally dispersed vat dyestuff, breaking the said emulsion, and separating the aqueous solution and the benzene from the colored fatty oil thus produced, the said colored fatty oil having colloidally dispersed therein an insoluble vat dyestuff.

16. In the manufacture of colored waxes having colloidally dispersed therein an insoluble vat dye, the process which comprises emulsifying paraffin wax in a hot aqueous solution, adding to said hot aqueous emulsion an aqueous solution of the soluble leuco compound of indanthrone, oxidizing said leuco compound to produce insoluble indanthrone, breaking said emulsion by carefully acidifying with hydrochloric acid, separating the water from the bright blue curd thus produced.

17. In the manufacture of colored organic materials having colloidally dispersed therein an insoluble color, the process which comprises forming an aqueous emulsion of a water insoluble organic liquid material, adding to said aqueous emulsion an aqueous solution of a soluble salt, adding to the mixture thus produced a second aqueous solution of another soluble salt capable of reacting with the first salt to form and precipitate an insoluble mineral pigment, thus forming an aqueous mixture comprising water, an emulsified organic material and a colloidally dispersed mineral pigment and breaking the emulsion and separating the water from the said organic material and said insoluble mineral pigment, thus producing a colored mass of organic material having colloidally dispersed therein an insoluble mineral pigment.

18. In the manufacture of colored organic materials having colloidally dispersed therein an insoluble color, the process which comprises forming an aqueous emulsion of a water insoluble organic liquid material, adding to said aqueous emulsion an aqueous solution of a diazo compound, adding to the aqueous mixture thus produced an aqueous solution of an azo dye coupling component, thus producing an aqueous mixture comprising water, an emulsified organic material and a colloidally dispersed azo dyestuff, breaking the emulsion and separating the water from the said organic material and said insoluble azo dyestuff thus producing a colored mass of organic material having colloidally dispersed therein said insoluble azo dyestuff.

19. In the manufacture of colored organic materials having colloidally dispersed therein an insoluble color, the steps which comprise precipitating an insoluble color in situ in an aqueous emulsion of an organic material to produce an aqueous mixture comprising water, an emulsified organic material and a colloidally dispersed insoluble color, said insoluble color being of the class consisting of insoluble mineral pigments and insoluble azo dyestuffs, and breaking said emulsion and separating the water from said organic material and said insoluble color.

20. In the manufacture of colored fatty oils having colloidally dispersed therein an insoluble color, said insoluble color being of the class consisting of an insoluble mineral pigment and an insoluble azo dyestuff, the process which comprises emulsifying said fatty oil in an aqueous solution, precipitating in situ in said aqueous emulsion an insoluble color of the class consisting of insoluble mineral pigments and insoluble azo dyes, breaking the emulsion and separating the aqueous solution from the said colored fatty oil, thus producing a colored fatty oil having colloidally dispersed therein said insoluble color.

21. In the manufacture of colored organic materials having colloidally dispersed therein an insoluble color, the step which comprises precipitating an insoluble anthraquinone vat color in situ, in an aqueous emulsion of a water insoluble organic liquid material to produce an aqueous mixture comprising water, an emulsified organic material and a colloidally dispersed insoluble color and breaking said emulsion and separating the water from the said organic material and said insoluble color.

In testimony whereof we affix our signatures.

ANTHONY JAMES HAILWOOD.
ARNOLD SHEPHERDSON.
ALEXANDER STEWART.